(12) United States Patent
Stoppe et al.

(10) Patent No.: US 10,175,468 B2
(45) Date of Patent: Jan. 8, 2019

(54) METHOD FOR GENERATING A CONTRAST IMAGE OF AN OBJECT STRUCTURE AND APPARATUSES RELATING THERETO

(71) Applicant: Carl Zeiss Microscopy GmbH, Jena (DE)

(72) Inventors: Lars Stoppe, Jena (DE); Christoph Husemann, Jena (DE)

(73) Assignee: Carl Zeiss Microscopy GMBH, Jena (DE)

(*) Notice: Subject to any disclaimer, the term of this patent is extended or adjusted under 35 U.S.C. 154(b) by 247 days.

(21) Appl. No.: 15/142,269

(22) Filed: Apr. 29, 2016

(65) Prior Publication Data

US 2016/0320603 A1 Nov. 3, 2016

(30) Foreign Application Priority Data

Apr. 30, 2015 (DE) .................. 10 2015 208 084

(51) Int. Cl.
*G02B 21/36* (2006.01)
*G02B 21/00* (2006.01)
*H04N 5/265* (2006.01)
*G06T 5/50* (2006.01)
*H04N 5/232* (2006.01)
(Continued)

(52) U.S. Cl.
CPC ....... *G02B 21/367* (2013.01); *G02B 21/0056* (2013.01); *G06T 5/50* (2013.01); *G06T 7/90* (2017.01); *H04N 5/232* (2013.01); *H04N 5/265* (2013.01); *H04N 9/79* (2013.01); *G06T 2207/10056* (2013.01); *G06T 2207/10152* (2013.01)

(58) Field of Classification Search
CPC .............. G02B 21/0056; G02B 21/367; G06T 2207/10056; G06T 2207/10152; G06T 5/50; G06T 7/90; H04N 5/265; H04N 9/79
See application file for complete search history.

(56) References Cited

U.S. PATENT DOCUMENTS

2009/0095086 A1* 4/2009 Kessler ................ G01N 29/069
73/606
2009/0110252 A1* 4/2009 Baumgart .............. A61B 6/481
382/130
(Continued)

*Primary Examiner* — Md N Haque
(74) *Attorney, Agent, or Firm* — Nixon Peabody LLP; Jeffrey L. Costellia

(57) ABSTRACT

The invention relates to a contrast formation method, for generating a contrast image, including the steps: Illuminating an object by an illumination sequence based on one or more illumination sources; creating an illumination image of the object for each illumination in the illumination sequence; overlaying two respective illumination images which neighbor each other with respect to a first axis to form a first total axis image of the first axis; overlaying two respective illumination images which neighbor each other with respect to a second axis to form a second total axis image of the second axis; creating a first color gradient image based on the first total axis image; creating a second color gradient image based on the second total axis image; transforming the first color gradient image and the second color gradient image into a color space; and generating a contrast image, based on the transformed first color gradient image and the second color gradient image into the color space.

11 Claims, 5 Drawing Sheets

(51) Int. Cl.
*H04N 9/79* (2006.01)
*G06T 7/90* (2017.01)

(56) References Cited

U.S. PATENT DOCUMENTS

| | | | | |
|---|---|---|---|---|
| 2009/0218527 | A1* | 9/2009 | French | G02B 21/004 250/578.1 |
| 2013/0071028 | A1* | 3/2013 | Schiller | G06T 5/003 382/180 |
| 2013/0258090 | A1* | 10/2013 | Steinmeyer | G02B 21/361 348/79 |
| 2014/0268258 | A1* | 9/2014 | Cuciurean-Zapan | H04N 1/60 358/504 |
| 2015/0049348 | A1* | 2/2015 | Schmidt | G02B 21/14 356/630 |

\* cited by examiner

METHOD FOR GENERATING A CONTRAST IMAGE OF AN OBJECT STRUCTURE AND APPARATUSES RELATING THERETO

The present invention relates to a method for generating a contrast image, in particular for reading height profile and/or phase profile information of an object structure, and to apparatuses relating thereto.

In addition to the typical bright-field imaging, various forms of contrast methods are used to obtain additional information about the object under observation both in classical biological microscopy and in materials microscopy. Examples of this are phase contrast methods (for example Zernike, differential interference contrast DIC) or alternative image generation methods (for example dark-field). Presently, variants are described as to how contrast images can be computed from individual images. The publications to date describe DIC alternatives, wherein this typically results in grey images and wherein the quality of the computed contrast images is strongly directionally dependent. All described contrasts generally have the disadvantage that, while they emphasize a specific property of the object, other properties are ignored or lessened. By way of example, DIC methods, or the digital analog of forming the difference between images of opposite illumination directions (DPC), have the disadvantage that they only generate directionally dependent grey level images.

It would therefore be desirable to provide a capability that allows directionally dependent colour coding of an object structure, in particular of height profile and/or phase profile information of the object structure.

It is the goal of the invention to propose a way for avoiding or at least reducing at least some of the disadvantages known in the prior art.

The object is achieved according to the invention by way of a method according to the main claim and by way of apparatuses according to the coordinate claims.

The subject matter of the main claim here relates to a contrast formation method for generating a contrast image, preferably from microscopic images, in particular for reading height profile and/or phase profile information of an object structure. The contrast formation method includes: illuminating an object by means of an illumination sequence based on one or a plurality of (two or more) illumination sources. Creating an illumination image of the object for each illumination in the illumination sequence. Overlaying two respective illumination images which neighbour each other with respect to a first axis to form a first total axis image of the first axis. Overlaying two respective illumination images which neighbour each other with respect to a second axis to form a second total axis image of the second axis. Creating a first colour gradient image based on the first total axis image. Creating a second colour gradient image based on the second total axis image. Transforming the first colour gradient image and the second colour gradient image into a colour space. And generating a contrast image, based on the transformed first colour gradient image and the second colour gradient image into the colour space, such that four pieces of directional information of a phase or height profile of a structure of the object can be represented in colour-coded fashion.

The method steps can here be performed in automated fashion.

A piece of height profile information of an object structure within the meaning of the invention can here include a piece of information which offers clues relating to an object structure in all three spatial dimensions.

An illumination sequence within the meaning of the invention can here be a concrete sequence of illuminations. To this end, one illumination source is activated in each case, while the remaining illumination sources are inactive.

An illumination source within the meaning of the invention can be a light source for lighting the object. By arranging a plurality of such illumination sources around the object, it is possible to achieve angularly selective lighting of the object. By way of example, the illumination source can be a ring lighting means or an individual LED lighting means with a plurality of individual light sources (for example LEDs) arranged at an objective, and with which lighting of the object from the various quadrants (North-NE-East-SE-South-SW-West-NW) can be implemented in a prespecified order individually or combined.

An illumination image within the meaning of the invention can be a recording of an object within the illumination sequence.

Overlaying two neighbouring illumination images within the meaning of the invention can be a process in which in each case identical image proportions of two images are strengthened or weakened. This can be done, for example, in pixel-wise fashion.

A total axis image within the meaning of the invention can be an image that is produced by overlaying or combining illumination images. Those illumination images which neighbour each other with respect to the same axis can be used herefor.

A colour gradient image within the meaning of the invention can be an image which is produced if a corresponding colour gradient is placed over a total axis image. In a Cartesian coordinate system, for example, it is possible to place a first colour gradient, such as a blue-yellow gradient, for the x-axis, and a further colour gradient, for example red-green gradient, for the y-axis. The colour gradient image of the total axis image for the x-axis would then have a blue-yellow colour gradient. This colour gradient can be indicative of a height profile of the object in the horizontal axis, while the colour gradient of the colour gradient image of the total axis image of the y-axis can be indicative of a height profile of the object in the vertical axis. In particular, a colour gradient can also be a contrast.

If the colour gradient is a contrast, the height profile of the structure of the object can be representable in colour-coded fashion by using a piece of brightness information as colour coding, wherein the brightness in the image or the brightness of the pixel represents the height information.

A colour space within the meaning of the invention can be a digitally defined colour space as is used, for example, for computer screens and/or in the printing field. The teaching according to the invention attains the advantage that both a piece of information about the material structure and a piece of height information of the object can be represented in an image. Furthermore, the object can be represented in original colours, and it is possible by way of the brightness to achieve spatial association. It is thus possible in a simple and fast manner to achieve a combination of individual contrasts in an individual image to represent more information about the object in the object image.

The subject matter of a coordinate claim here relates to a contrast forming apparatus for generating a contrast image, preferably from microscopic images, in particular for reading height profile information of an object structure, with particular preference for light microscopy, the contrast formation apparatus having an image recording apparatus and a contrast formation apparatus. Here, the image recording apparatus is configured to record or to digitally capture, in a known manner, an image of an object and to transmit a result of the image recording, that is to say an image, to the contrast formation apparatus. Here, the contrast formation apparatus is configured to perform a contrast formation method according to the invention. An image recording apparatus within the meaning of the invention can be an apparatus that is suitable for optically capturing and representing an object. In particular, the image recording apparatus can be a microscope, with particular preference a light microscope. The image recording apparatus can furthermore have a plurality of illumination sources for angularly selective lighting of the object to be imaged.

A contrast formation apparatus within the meaning of the invention can have an apparatus which is configured to generate contrasts from images which are formed during the image recording owing to the lighting of the object. The contrast formation apparatus can for this purpose have a CPU and an associated architecture. The contrast formation apparatus can in particular be integrated in an image processing unit of the microscope or be a correspondingly set-up computer.

The teaching according to the invention attains the advantage that in a cost-effective manner an apparatus can be provided which allows angularly selective lighting of an object, while a plurality of images are captured in order to obtain a combination of individual contrasts of the captured images in an individual image in order to represent more information about the object in the object image.

The subject matter of a further coordinate claim here relates to a computer program product for a contrast forming apparatus according to the invention which is operable according to a contrast formation method according to the invention. The computer program comprises program coding means in which the steps of the contrast formation method according to the invention are implemented by means of image processing. The computer program can be implemented as hardware code in a real-time image processing unit, or be alternatively embodied purely as an image postprocessing means.

In the advantageous integration of the program code for the contrast formation method in the hardware (digital image processing unit of a light microscope), very rapid image processing can take place and the result can be observed quasi as "live" image, because the recording of the individual images and the image processing thereof is faster than the reproduction frequency of the live image.

The teaching according to the invention attains the advantage that the contrast formation method is thus operable in automated fashion and can be provided in a simple and cost-effective manner for corresponding different apparatuses according to the invention. With particular advantage, the computer program product is integrated or integratable into the image processing unit of the microscope. It can also be integrated as a hardware code in the image processing hardware.

The subject matter of a further coordinate claim here relates to a data carrier having a computer program product according to the invention.

The teaching according to the invention attains the advantage that the contrast formation method is thus operable in automated fashion and can be provided in a simple and cost-effective manner for corresponding different apparatuses according to the invention and can be transported easily so as to port the method directly to the corresponding apparatus according to the invention, at the site of the apparatus.

Before embodiments of the invention are described in more detail below, it should be noted that the invention is not limited to the components described or to the method steps described. The terminology used furthermore represents no limitation, but merely has exemplary character. To the extent that the description and the claims use the singular, this in each case also comprises plural, unless the context explicitly excludes this. Any method steps can be performed in automated fashion, unless the context explicitly excludes this.

Further exemplary embodiments of the method according to the invention will be explained below.

According to a first exemplary embodiment, in the contrast formation method, the overlaying of two respective illumination images which neighbour each other with respect to the first axis to form the first total axis image of the first axis, and the overlaying of two respective illumination images which neighbour each other with respect to the second axis to form the second total axis image of the second axis, in each case correspondingly includes: computing two respective illumination images which neighbour each other with respect to the corresponding first axis or second axis to form corresponding intermediate images with respect to the corresponding first axis or second axis. Computing the corresponding intermediate images to form the corresponding first total axis image or the second total axis image. The respective computation includes in each case addition or subtraction. However, in addition scaling, image filtering or a different type of image processing can also be carried out for the individual images—before and/or after the addition or subtraction. This embodiment has the advantage that a method part can be used repeatedly to obtain the corresponding total axis image. It is thereby possible to simplify the method.

According to a further exemplary embodiment, the contrast formation method furthermore includes that the overlaying of the corresponding illumination images to form the first total axis image of the first axis or to form the second total axis image of the second axis in each case includes a corresponding grey level transformation.

This embodiment has the advantage that the total axis image can thus be transformed such that unneeded colour information can be omitted in order to be able to use the total axis image in a simple manner for different information.

According to a further exemplary embodiment, in the contrast formation method, the transforming of the first colour gradient image and of the second colour gradient image into the colour space includes: associating the first colour gradient image with a first imaging channel of the colour space. And associating the second colour gradient image with a second imaging channel of the colour space.

An imaging channel of the colour space within the meaning of the invention can here be a channel of the colour space which is used for visual representation.

The RGB colour space, for example, has three imaging channels, the R channel, the G channel and the B channel, on which different colours are coded.

This embodiment has the advantage that the imaging channels of the colour space themselves can be used for information guidance about the object structure.

According to a further exemplary embodiment, in the contrast formation method, the transforming of the first colour gradient image and of the second colour gradient image into the colour space includes associating a piece of brightness information with a third imaging channel of the colour space.

This embodiment has the advantage that the brightness information can be used to normalize the image or to use the image to represent further information about the object structure in the colour space.

According to a further exemplary embodiment, in the contrast formation method, the transforming of the first colour gradient image and of the second colour gradient image into the colour space includes associating a grey level image with a third imaging channel of the colour space.

A grey level image within the meaning of the invention can be a piece of greyscale gradient information of the image. The grey level image can also have a contrast.

This embodiment has the advantage that the grey level image can be used to normalize the image or to use it to represent further information about the object structure in the colour space.

According to a further exemplary embodiment, the contrast formation method furthermore includes that two pieces of directional information of the four pieces of directional information are indicative of in each case one direction along the first axis. And furthermore, the contrast formation method includes that two further pieces of directional information of the four pieces of directional information are indicative of in each case one direction along the second axis.

This embodiment has the advantage that one piece of height profile information of the object structure can be represented in a simple manner in the colour space by using the directions of the axis, which are used for generating the total axis image, and are also used for the height profile information.

According to a further exemplary embodiment, the contrast formation method furthermore includes that the colour space is a CIELAB colour space, an additive colour space, a subtractive colour space or a hue saturation colour space.

A CIELAB colour space within the meaning of the invention can describe all perceivable colours. Among the most important properties of the CIELAB colour model are the device independence and the perception relationship. That means that colours are defined, independently of the type of their generation or reproduction technique, as they are perceived by a normal observer under standard light conditions. The colour model is defined in EN ISO 11664-4.

An additive colour space within the meaning of the invention can mean that the change in the colour sensation perceived by the eye takes place via successive addition of a respectively different colour stimulus. In principle, colour vision with the aid of sensors within the eye that are sensitive to colour in different ways is additive mixing. Since the additive colour mixing takes place in the eye and brain, it is also referred to as physiological colour mixing. An additive colour space can be, for example, the RGB colour space.

A subtractive colour space within the meaning of the invention can refer to the change in a colour stimulus upon reflection from the surface of a body by way of remission or when passing through a medium (colour filter) by way of transmission. In narrower terms, subtractive colour mixing is understood to mean that extreme principle in which the diversity of the colour space is reproduced by series connection of three colour filters. By way of example, the CMY colour space or the CMYK colour space can be a subtractive colour space.

A hue saturation colour space within the meaning of the invention can be a colour space in which the colour is defined with the aid of the hue, the saturation and the brightness value (or the dark level). This is also referred to as the HSV colour space. Similar definitions give a HSL colour space with relative lightness, a HSB colour space with absolute brightness, and a HSI colour space with the light intensity.

This embodiment has the advantage that well defined and widely known colour spaces can be used, as a result of which the development complexity can be reduced, which can result in cost reduction.

According to a further exemplary embodiment, the contrast formation method furthermore includes that the generating of the contrast image takes place in dependence on the colour space. This embodiment has the advantage that a decision can be made in dependence on the colour space as to which object information is to be represented coded with what colour.

According to a further exemplary embodiment, the contrast formation method furthermore includes that, after termination of the illumination sequence, each illumination source has illuminated the object once.

The contrast formation method can furthermore include that, after termination of the illumination sequence, each illumination source has illuminated the object exactly once.

This embodiment has the advantage that the object is illuminated from all available directions to obtain the corresponding object information from all available illumination directions.

According to a further exemplary embodiment, the contrast formation method furthermore includes that in the illumination sequence, each illumination source illuminates the object individually.

This embodiment has the advantage that the object needs to be lit only as often as necessary and that only the minimum number of illumination images needed needs to be made to represent the desired object information.

The invention thus allows provision of a method and associated apparatuses, as a result of which it becomes possible, by means of angularly selective lighting, to represent different properties of a corresponding object. This can be done, for example, by means of:

DPC—difference of images of opposite lighting directions→phase gradient (BIO) or height profile gradient (MAT)

SEC—sum enhanced contrast: sum of all individual images+absolute value (DPCx—difference of opposite images in the x-direction)+absolute value (DPCy—difference of opposite images in the y-direction)→sum of the absolute values of the increases and PK image overlaid→no direct individual information can be read, but simultaneous visualization of different effects DEC—difference enhanced contrast: sum of all individual images—absolute value (DPCx)—absolute value (DPCy)→difference of the PK image and of the absolute values of the increases→no direct individual information can be read, but simultaneous visualization of different effects MSC—means sum contrast: sum of all differences of the absolute values of the individual images with their mean values→no directional information—extreme values are highlighted The abbreviations SEC, DEC and MSC used are defined in this application and are not known as technical terminology.

Now different contrasts and the sum of the individual images (PK) are used to code a plurality of pieces of information at the same time by means of special colour space associations.

HSV colour contrast: specifically the fact that the DIC/DPC contrasts do not represent the information about the material colour is a problem. For this reason, the following combination is possible:
  take the PK image;
  transform it from RGB into the HSV colour space
  replace the V channel (value) with a grey level image of the desired individual contrast (for example DICx)
  transform the image back to RGB
  if necessary, carry out brightness adaptation
  the result now has the same colour as the original, but contains in the brightness the information of the individual contrast (for example an increase in the x-direction)
LAB colour contrast: likewise bothersome is that the directional information of the phase gradient in DIC/DPC can be visualized only in one direction. The following transformation solves this problem:
  use the PK image
  transform it into the Lab colour space
  replace the a and b channels with the desired individual contrasts (for example DPCx, DPCy)
  transform the image back into the RGB colour space
  the result has the same brightness values as the original image (PK), but the information of the two individual contrasts are stored in a and b.
By way of example, in DPCx and DPCy, all increase directions are thus represented and at the same time colour-coded.
RGB colour contrast:
  write three different individual contrasts, (for example PK, DPCx, DPCy) into the RGB colour channels
  the result codes all three pieces of contrast information in terms of colour This generates the advantage that a simple and quick combination of individual contrasts in an individual image can be made possible. Furthermore, the method is information-containing (colour/brightness) in HSV and LAB.

The invention will be explained in more detail below with reference to the figures, in which.

Figure 1:
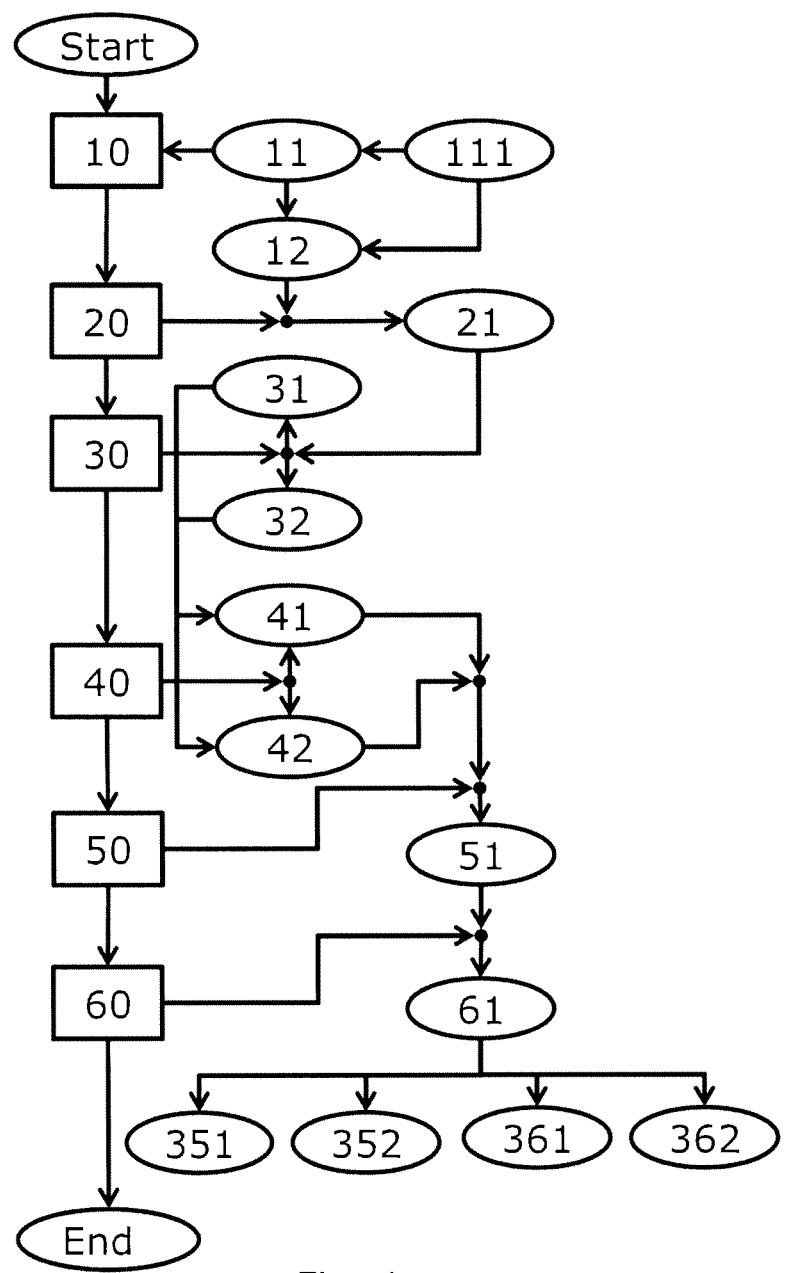
FIG. 1 shows a schematic illustration of a proposed method according to an exemplary embodiment of the invention.

Here, FIG. 1 shows a schematic illustration of a contrast formation method for generating a contrast image, preferably from microscopic images, in particular for reading height profile information of an object structure. Here, the contrast formation method includes: illuminating 10 an object by means of an illumination sequence 11 based on a multiplicity of illumination sources 111. Creating 20 an illumination image 21 of the object for each illumination 12 in the illumination sequence 11. Overlaying 30 two respective illumination images 21 which neighbour each other with respect to a first axis 35 (not illustrated in FIG. 1) to form a first total axis image 31 of the first axis 35. Overlaying 30 two respective illumination images 21 which neighbour each other with respect to a second axis 36 (not illustrated in FIG. 1) to form a second total axis image 32 of the second axis 36. Creating 40 a first colour gradient image 41 based on the first total axis image 31. Creating 40 a second colour gradient image 42 based on the second total axis image 32. Transforming 50 the first colour gradient image 41 and the second colour gradient image 42 into a colour space 51. And generating 60 a contrast image 61, based on the transformed 50 first colour gradient image and the second colour gradient image 42 into the colour space 51, such that four pieces of directional information 351, 352, 361, 362 of a height profile of a structure of the object can be represented in colour-coded fashion.

Figure 2:
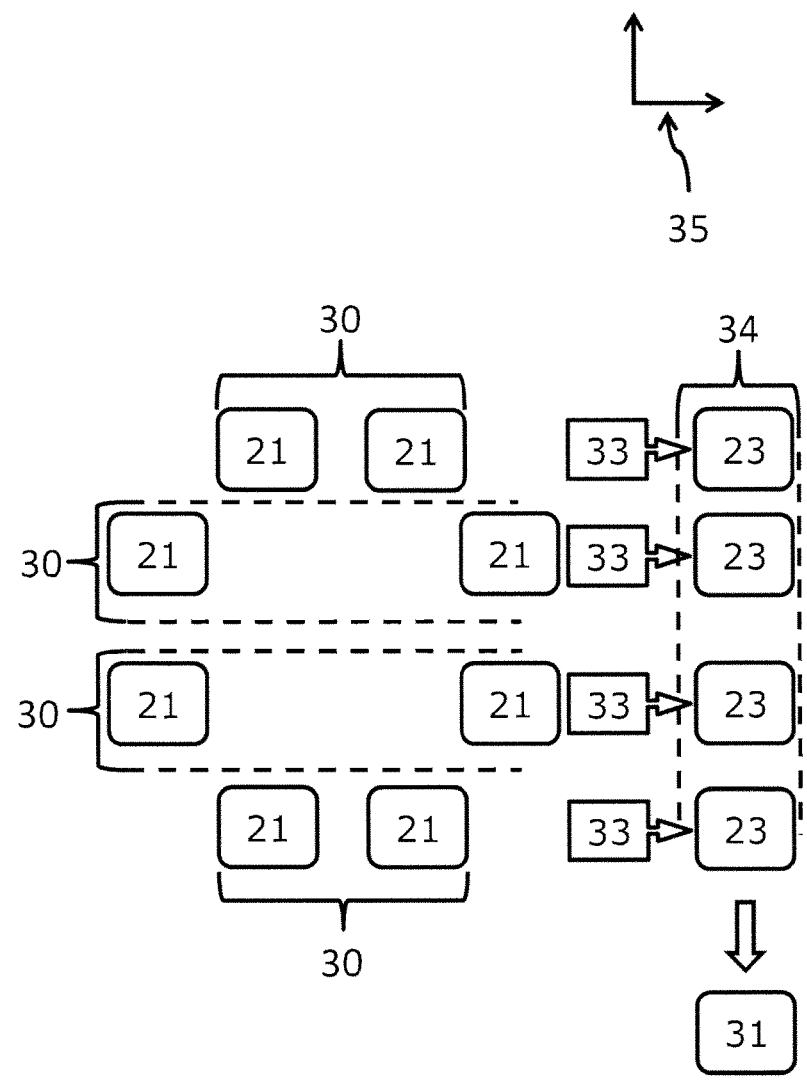
FIG. 2 shows a schematic illustration of a proposed method according to another exemplary embodiment of the invention.
Figure 3:
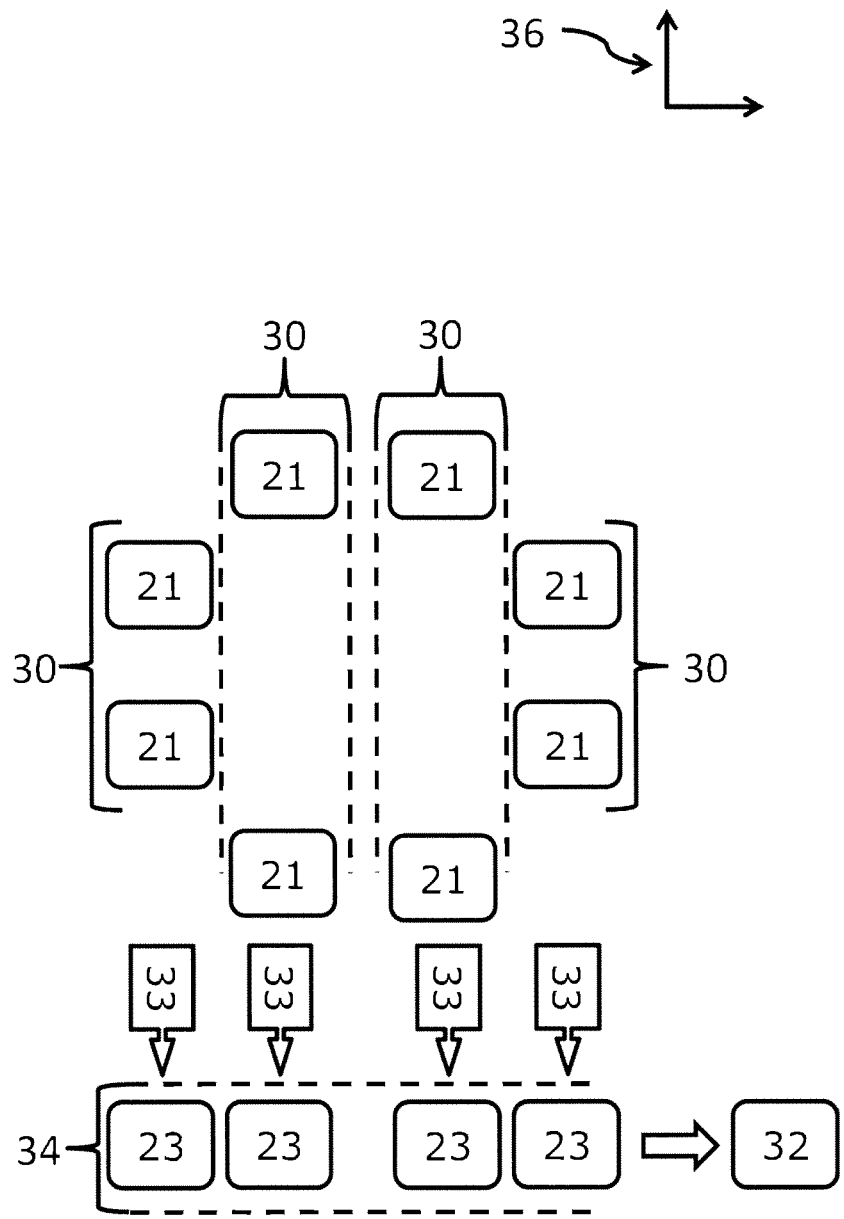
FIG. 3 shows a schematic illustration of a proposed method according to another exemplary embodiment of the invention.

FIG. 2 and FIG. 3 in each case show a schematic illustration of overlaying neighbouring illumination images to form a total axis image according to another exemplary embodiment of the invention.

FIG. 2 here shows overlaying 30 of two respective illumination images 21 which neighbour each other with respect to the first axis 35 to form the first total axis image 31 of the first axis 35. In the process, two respective illumination images 21 which neighbour each other with respect to the corresponding first axis 35 are computed 33 to form corresponding intermediate images 23 with respect to the corresponding first axis 35. Furthermore, the corresponding intermediate images 23 are computed 34 to form the corresponding first total axis image 31.

FIG. 3 here shows correspondingly overlaying 30 of two respective illumination images 21 which neighbour each other with respect to the second axis 36 to form the second total axis image 32 of the second axis 36.

In the process, two respective illumination images 21 which neighbour each other with respect to the corresponding second axis 36 are computed 33 to form corresponding intermediate images 23 with respect to the corresponding second axis 36. Furthermore, the corresponding intermediate images 23 are computed 34 to form the corresponding second total axis image 32.

The respective computation 33, 34 in each case includes an addition or a subtraction.

Figure 4:
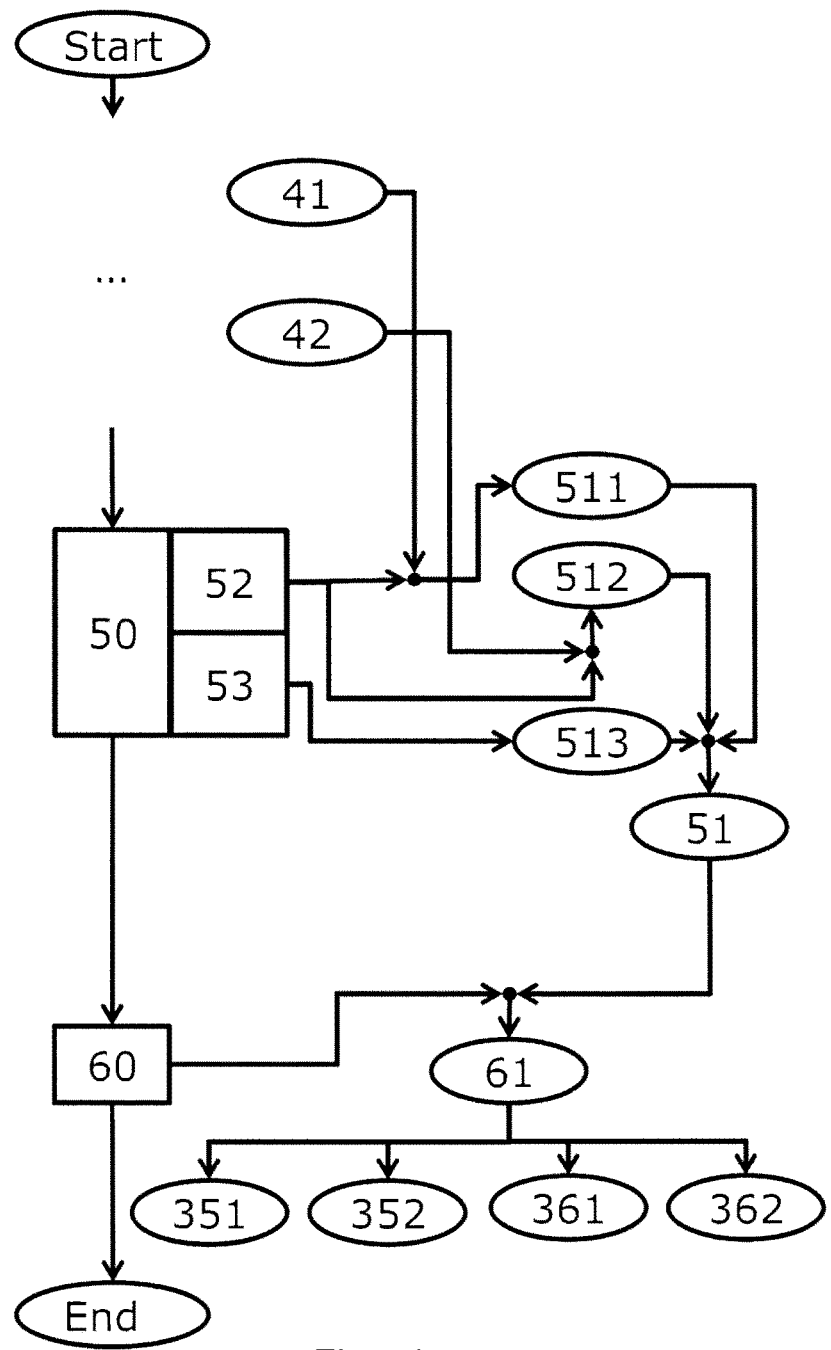
FIG. 4 shows a schematic illustration of a proposed method according to another exemplary embodiment of the invention.

FIG. 4 shows a schematic illustration of a proposed method according to another exemplary embodiment of the invention.

FIG. 4 shows a schematic illustration of a method which has been expanded with respect to the method of FIG. 1.

What was said previously regarding FIG. 1 to FIG. 3 applies correspondingly to FIG. 4. For the sake of continuing clarity, the method parts that go before the transforming 50 are not illustrated in FIG. 4. However, they can be seen in FIG. 1.

As can be seen in FIG. 4, in the contrast formation method, the transforming 50 of the first colour gradient image 41 and of the second colour gradient image 42 into the colour space 51 moreover includes: associating 52 the first colour gradient image 41 with a first imaging channel 511 of the colour space 51. And furthermore associating 52 the second colour gradient image 42 with a second imaging channel 512 of the colour space 51.

In the example of FIG. 4, the transforming 50 of the first colour gradient image 41 and of the second colour gradient image 42 into the colour space 51 furthermore includes associating 53 an additional piece of information, such as a piece of brightness information and/or a grey level image, with a third imaging channel 513 of the colour space 51.

In the example of FIG. 4, two pieces of directional information 351, 352 of the four pieces of directional information 351, 352, 361, 362 are indicative of in each case one direction along the first axis 35 (not illustrated in FIG. 4), while two further pieces of directional information 361, 362 of the four pieces of directional information 351, 352, 361, 362 are indicative of in each case one direction along the second axis 36 (not illustrated in FIG. 4).

Figure 5:
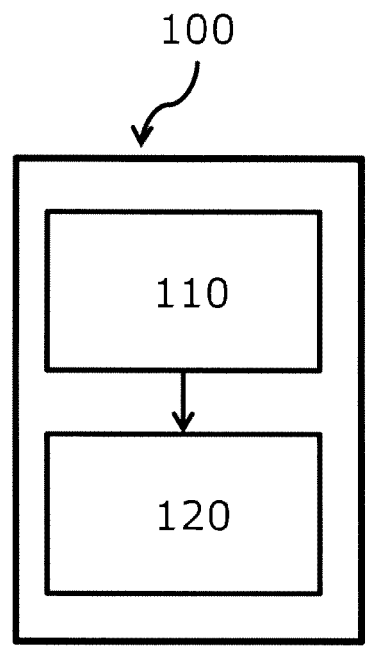
FIG. 5 shows a schematic illustration of a proposed apparatus according to another exemplary embodiment of the invention.

FIG. 5 shows a schematic illustration of a proposed apparatus according to a further exemplary embodiment of the invention.

FIG. 5 shows a schematic illustration of a contrast forming apparatus 100 for generating a contrast image, preferably from microscopic images, in particular for reading height profile information of an object structure, with particular preference for light microscopy. The contrast forming apparatus 100 here includes: an image recording apparatus 110 and a contrast formation apparatus 120. The image recording apparatus 110 is configured to optically capture an image of the object and to transmit it to the contrast formation apparatus 120. Here, the contrast forming apparatus 100 is configured to perform a contrast formation method according to the invention.

LIST OF REFERENCE SIGNS 10 illuminating the object
11 illumination sequence
12 illumination in the illumination sequence
20 creating an illumination image
21 illumination image
23 intermediate image with respect to the first axis
24 intermediate image with respect to the second axis
30 overlaying two illumination images
31 first total axis image
32 second total axis image
33 computing two illumination images to form an intermediate image
34 computing two intermediate images to form a total axis image
35 first axis
36 second axis
40 creating a colour gradient image
41 first colour gradient image
42 second colour gradient image
50 transforming the colour gradient images into a colour space
51 colour space
52 associating a colour gradient image with an imaging channel of the colour space
53 associating another piece of information with the third imaging channel of the colour space
60 generating a contrast image
61 contrast image
100 contrast forming apparatus
110 image recording apparatus
111 illumination source
120 contrast formation apparatus
351 first piece of directional information of the height profile
352 second piece of directional information of the height profile
361 third piece of directional information of the height profile
362 fourth piece of directional information of the height profile
511 first imaging channel of the colour space
512 second imaging channel of the colour space
513 third imaging channel of the colour space

The invention claimed is:

1. A method for generating a contrast image from microscopic images for reading height profile information of an object structure from the contrast image, the method comprising:
illuminating an object by implementing an illumination sequence based on one or more illumination sources;
creating digital illumination image of the object for each illumination source in the illumination sequence;
overlaying of all digital illumination images to a PK-image in an RGB color space;
transforming the PK-image into a second color space;
overlaying two respective digital illumination images which neighbor each other with respect to a first axis to form a first total axis image of the first axis;
overlaying two respective illumination images which neighbor each other with respect to a second axis to form a second total axis image of the second axis;
replacing at least one channel of the transformed PK image by at least one of gray levels and color gradients for the first total axis image and the second total axis image;
transforming the PK image into the RGB color space.

2. The method of claim 1, wherein the overlaying of two respective illumination images which neighbor each other with respect to the first axis to form the first total axis image of the first axis, and the overlaying of two respective illumination images which neighbor each other with respect to the second axis to form the second total axis image of the second axis in each case comprises:
computing two respective illumination images which neighbor each other with respect to the corresponding first axis or second axis to form corresponding intermediate images with respect to the corresponding first axis or second axis,
computing the corresponding intermediate images to form the corresponding first total axis image or the second total axis image, and
wherein the respective computation is performed by addition or subtraction.

3. The method of claim 1, wherein the overlaying of the corresponding illumination images to form the first total axis image of the first axis or to form the second total axis image of the second axis in each case comprises a corresponding grey level transformation.

4. The method of claim 1, wherein two pieces of directional information of the four pieces of directional information are indicative of in each case one direction along the first axis, and two further pieces of directional information of the four pieces of directional information are indicative of in each case one direction along the second axis.

5. The method of claim 1, wherein the color space is a CIELAB color space, an additive color space, a subtractive color space or a hue saturation color space.

6. The method of claim 1, wherein the generating of the contrast image takes place in dependence on the color space.

7. The method of claim 1, wherein, after termination of the illumination sequence, each illumination source has illuminated the object once.

8. The method of claim 1, wherein, in the illumination sequence, each illumination source illuminates the object individually.

9. An apparatus for generating a contrast image from microscopic images for reading height profile information of an object structure for light microscopy, the apparatus comprising:

an image recording apparatus;
    an illumination device configured to create an illumination sequence; and
    a contrast formation apparatus, wherein the image recording apparatus is configured to capture an image of an object and to transmit a result of the capturing to the contrast formation apparatus, and wherein the contrast forming apparatus is configured to:

illuminate an object by implementing an illumination sequence based on one or more illumination sources;
    create a digital illumination image of the object for each illumination source in the illumination sequence;
    overlay of all digital illumination images to a PK-image in an RGB color space;
    transform the PK-image into a second color space;
    overlay two respective digital illumination images which neighbor each other with respect to a first axis to form a first total axis image of the first axis;
    overlay two respective illumination images which neighbor each other with respect to a second axis to form a second total axis image of the second axis;
    replace at least one channel of the transformed PK image by at least one of gray levels and color gradients for the first total axis image and the second total axis image;
    transform the PK image into the RGB color space.

10. A non transitory machine-readable medium having stored thereon instructions for performing a method comprising machine executable code which when executed by at least one machine, causes the machine to:

illuminate an object by implementing an illumination sequence based on one or more illumination sources;
    create a digital illumination image of the object for each illumination source in the illumination sequence;
    overlay of all digital illumination images to a PK-image in an RGB color space;
    transform the PK-image into a second color space;
    overlay two respective digital illumination images which neighbor each other with respect to a first axis to form a first total axis image of the first axis;
    overlay two respective illumination images which neighbor each other with respect to a second axis to form a second total axis image of the second axis;
    replace at least one channel of the transformed PK image by at least one of gray levels and color gradients for the first total axis image and the second total axis image;
    transform the PK image into the RGB color space.

11. A data carrier comprising a non transitory machine-readable medium having stored thereon instructions for performing a method comprising machine executable code which when executed by at least one machine, causes the machine to:

illuminate an object by implementing an illumination sequence based on one or more illumination sources;
    create a digital illumination image of the object for each illumination source in the illumination sequence;
    overlay of all digital illumination images to a PK-image in an RGB color space;
    transform the PK-image into a second color space;
    overlay two respective digital illumination images which neighbor each other with respect to a first axis to form a first total axis image of the first axis;
    overlay two respective illumination images which neighbor each other with respect to a second axis to form a second total axis image of the second axis;
    replace at least one channel of the transformed PK image by at least one of gray levels and color gradients for the first total axis image and the second total axis image;
    transform the PK image into the RGB color space.

\* \* \* \* \*